Sept. 5, 1933.  E. T. JOHNSSON  1,925,836
REGULATING APPARATUS
Filed Aug. 7, 1929   2 Sheets-Sheet 1
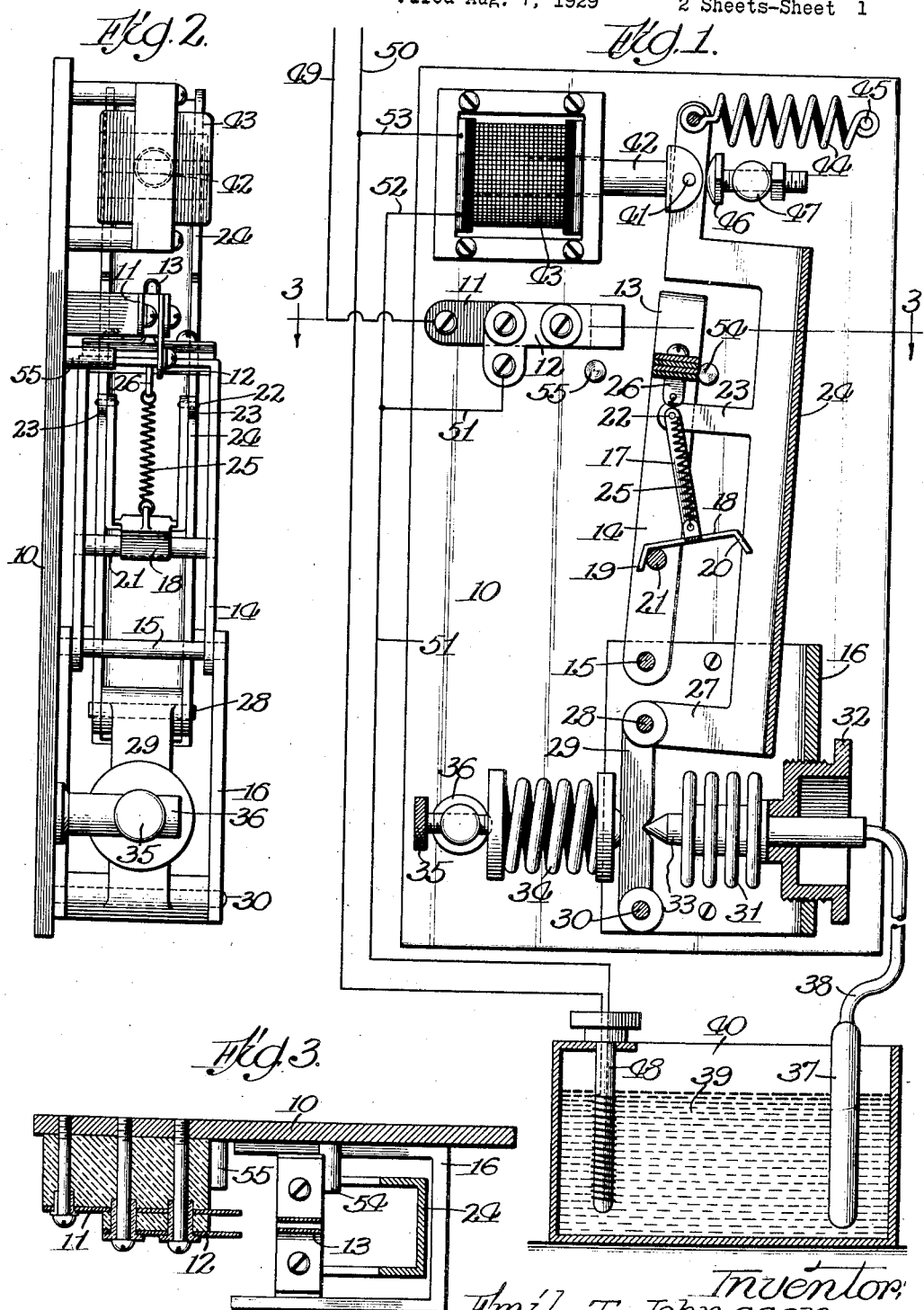

Sept. 5, 1933.  E. T. JOHNSSON  1,925,836
REGULATING APPARATUS
Filed Aug. 7, 1929   2 Sheets-Sheet 2
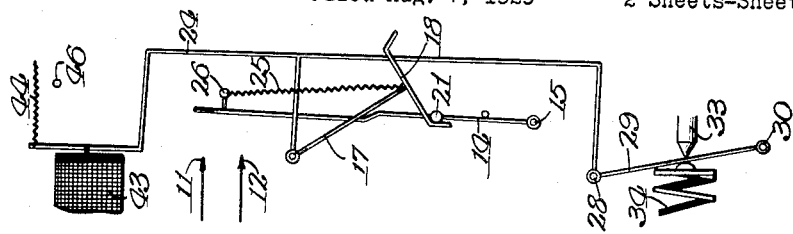
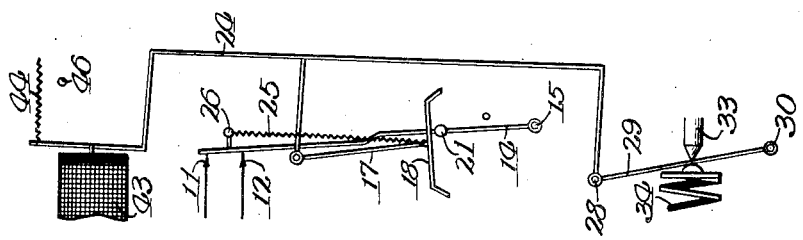
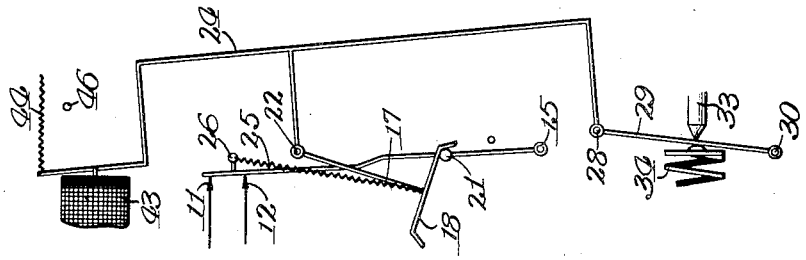
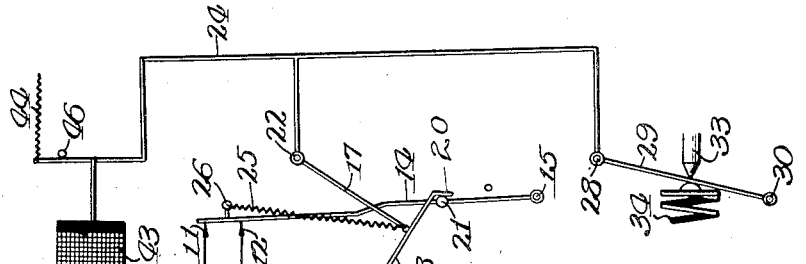
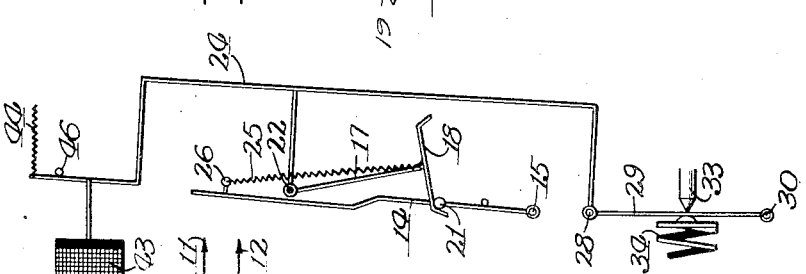
Inventor:
Emil T. Johnsson
By Glenn G. Noble, Atty Patented Sept. 5, 1933

1,925,836

UNITED STATES PATENT OFFICE 1,925,836

REGULATING APPARATUS

Emil T. Johnsson, Chicago, Ill.

Application August 7, 1929. Serial No. 384,127

26 Claims. (Cl. 200—88)

This invention pertains to devices or apparatus for controlling or regulating heat, temperature pressure or the like wherever such control may be desired, as for instance in the various arts or for regulating temperature of rooms. It is particularly intended for use where close or accurate regulation is desired and provides a particularly sensitive regulating apparatus.

The objects of this invention are the provision of a heat regulator which will serve to maintain the temperature within narrow limits; to provide a regulator having differential actuating mechanism; to provide a heat regulator having operative mechanism actuated in part by thermostatic means and in part by other actuating means such as an electro-responsive device; to provide a heat regulator having an electric switch with combined thermostatic and electric switch actuating mechanism; and to provide such other novel features and improvements in construction as will be described more fully hereinafter.

In the accompanying drawings illustrating this invention

Figure 1 is a front view with parts shown in section or diagrammatically;

Figure 2 is a side view;

Figure 3 is a sectional view taken on the line 3—3 of Figure 1; and

Figures 4 to 8, inclusive, are diagrammatic views illustrating the movements of the apparatus.

In the particular arrangement shown in these drawings, 10 is a frame or panel on which the controlling switch which is to be actuated is mounted. This switch may be of any suitable form, but in the present instance comprises two contacts or terminals 11 and 12 which are insulated from each other and which are adapted to be connected by a switch blade 13 mounted on an arm 14 and preferably insulated therefrom. The arm 14 is bifurcated or of U-shape and the ends opposite the blade are pivoted at 15 in an open box-like bearing member 16 which is secured to the frame 10.

The arm 14 is actuated by a substantially U-shaped arm or pendulum 17 having a cross bar or head 18 at its lower end with tappets or projections 19 and 20 which engage with a cross member or rod 21 on the arm 14. The pendulum 17 is pivoted at 22 to projections or bearings 23 on an operating arm or bar 24. The lower end of the pendulum 17 is connected to the arm 14 by an overthrow spring 25, the upper end of which is secured to a projection 26 on the cross portion of the arm. This arrangement is such that when the pendulum or vibratory member 17 is swung in one direction by the spring, the projection 19 will engage with the rod or pin 21 and throw the switch open, and when the pendulum is swung in the opposite direction by the spring the projection 20 will engage with the rod 21 and throw the switch to closed position.

The operating member 24 is substantially channel-shaped in cross section and at the lower end has projections 27 which are pivoted at 28 to the upper end of a lever 29. The lower end of this lever is pivoted at 30 in the bearing member 16. The lever 29 is actuated by any suitable thermostatic device, and it is the movement of this lever that causes the final movement of the operating bar 24 to actuate the switch. In the particular arrangement shown, an expansible member commonly designated as a diaphragm or bellows 31 is mounted on an adjustable plug 32 which has threaded engagement with the bearing member 16. The bellows has a pin or knife edge 33 which engages with one side of the lever 29. The bellows acts against the tension of a spring 34 which is interposed between the opposite side of the lever and an adjusting screw 35 which engages with a post 36 on the board 10.

The bellows 31 is connected with a bulb 37 by means of a tube 38 and these connecting parts filled with any suitable liquid or substance for transmitting pressure from the bulb to the bellows due to the heating of the bulb. The bulb may be located at any point where the temperature is to be controlled, and in the present arrangement is shown in a bath 39 in a tank 40, the temperature of such bath being controlled by the controlling apparatus.

In order to provide a differential motion so that a slight movement of the lever 29 which is actuated by the bellows will throw the switch, I provide an auxiliary operating mechanism for the upper end of the bar or operating lever 24. The upper end of this lever is pivotally connected at 41 with one end of a plunger or armature 42 of a solenoid 43. A tension spring 44 is also connected with the upper end of the bar 24 and has its opposite end secured to a fixed pin 45 on the frame. An adjustable stop for the upper end of the bar is provided by a screw 46 which engages with a post 47 on the board.

An electric heating element 48 is illustrative of means for heating the bath 39 and receives current from the main supply wires 49 and 50 which also supply current to the solenoid 43 which is in parallel with the heating element.

The circuit arrangement is as follows: from wire 49 to switch terminal 11, switch blade 13, terminal 12, wire 51, heating element 48 and wire 50. The solenoid is connected with wire 51 by means of wire 52 and with wire 50 by means of wire 53 so that it is connected in the circuit with the main wires when the switch is closed.

It is, of course, apparent that when current is supplied to the heating element, the temperature of the bath will be raised, and when current is cut off the temperature will be lowered, the cycle of operation being as follows: Figure 4 shows the position of the parts for maximum heat or when the bellows has moved the lever 29 to the left and caused the switch to be opened. The movement of the switch lever is limited by stops 54 and 55.

As the temperature lowers and the pressure in the bellows decreases, the lever 29 is moved to the right under the influence of the spring 34 to the position shown in Figure 5. As the point 22 moves past the spring 25, the tension of the spring causes the pendulum to swing to the left until the projection 20 strikes the pin 21 which swings the switch lever 14 forcibly to the left and causes the closing of the switch as shown in Figure 5. At this time it will be seen that the pivot point 22 is at considerable distance from the center line of the spring 25, as shown in Figure 5. This figure shows the position which the parts would assume for low temperature or minimum heat position if no means were provided for moving the upper end of the bar 24. From this it will be seen that considerable movement of the bellows would be required to move the point 22 past the dead center of the spring 25 and lever 17. It is the function of the auxiliary actuating mechanism such as the solenoid to move the upper end of the bar 24 so that the point 22 will be relatively close to the spring. As soon as the switch is closed, current is immediately supplied to the solenoid 43 and as its armature moves to the left it swings the upper end of the bar 24 to the position shown in Figure 6, at which time the pivot point 22 is in close proximity to the spring and but little force or movement is necessary to move it past the dead center. Figure 7 shows the lever 29 moved to the left by the bellows until the point 22 is past the dead center, and the spring 25 is pulling the lever 17 to the right; and when the projection 19 strikes the pin 21, the switch lever 14 will be moved to open position as shown in Figure 8. When the switch is open, the circuit through the solenoid is automatically broken so that the upper end of the bar 24 will be drawn to the right by the spring 44 which causes the point 22 to assume a position adjacent to the opposite side of the spring, as shown in Figure 4, so that comparatively little movement is necessary for the lever 29 to again move this point past the dead center. By means of this arrangement a much stronger spring may be used for actuating the switch, and the movement of the lever 17 not only provides a positive blow for starting the movement of the switch lever, but is swung to such position that the spring has considerable advantage in pulling against the lever when in either extreme open or closed positions.

While I have shown and described my control apparatus in connection with an electric heating element, it may, of course, be used for controlling other instrumentalities and likewise other thermostatic means may be utilized for actuating the lever 29 and modifications may also be desirable in order to adapt the regulator for different purposes or conditions, and therefore I do not wish to be limited to the particular construction herein shown and described, except as specified in the following claims, in which I claim:

1. An apparatus for automatically opening and closing an electric circuit, comprising circuit opening and closing means, electro-responsive means for initiating the closing movement of said circuit closing means and thermostatic means actuated by the temperature of surrounding media cooperating with said electro-responsive means to complete the operation of said circuit closing means.

2. In an apparatus for automatically opening and closing an electric circuit, the combination of a switch, actuating means for opening and closing the switch, including an electro-responsive device for initiating the movement of such opening and closing mechanism, and other means operated by forces independent of said electro-responsive means for completing the operation of the switch.

3. In an apparatus of the character set forth, the combination of a pair of contacts, a switch blade coacting with the contacts, an operating bar, an overthrow spring device coacting with the bar and switch blade for swinging the blade, a lever pivotally connected to one end of said bar, thermostatic means for actuating said lever, and electro-responsive means connected with the other end of the bar, and coacting with the thermostatic means in actuating said bar to open and close the switch.

4. In an apparatus of the character set forth, the combination of an electric switch having a pivoted switch blade, an operating bar, an arm pivoted to the bar and having oppositely disposed projections at the free end thereof, an overthrow spring connected with the free end of the lever and with the switch lever, a pin on the switch lever adapted to be engaged at times by said projections to open and close the switch, a lever pivoted to the bar and having a fixed fulcrum, a pressure-responsive element engaging with said lever for swinging it in one direction, a spring for swinging it in the opposite direction, an electro-responsive device connected with the upper end of the bar for moving it in one direction, and a spring for moving it in the opposite direction, said pressure responsive element and said electro-responsive device coacting with the springs to move the bar and cause it to actuate the switch lever.

5. In an apparatus of the character set forth, the combination of a pair of contacts, a pivoted switch lever coacting with the contacts, an operating bar, a lever pivotally connected with said bar and having a cross piece at the free end thereof with oppositely disposed projections, an overthrow spring between the free end of the lever and the free end of the switch lever, a projection on the switch lever adapted to be engaged at times by the first named projections to move the switch lever to open or closed positions, a lever pivoted to one end of said arm and having a fixed fulcrum, a bellows pivotally connected with one side of the lever, and adapted to exert a varying pressure thereon, an adjustable spring engaging with the opposite side of the last named lever, a spring engaging with the other end of the bar and tending to move it in one direction, an adjustable stop for such end, and a solenoid connected with the upper end of the bar for swinging the same, which solenoid is adapted to be connected in a circuit with the switch contacts.

6. A temperature regulating apparatus including a thermostatic element adapted to be influenced by the temperature of a surrounding medium, an electric switch, connections between the switch and the thermostatic element whereby the movement of the switch will be accomplished in part by said thermostatic element, an electro-responsive element independent of said thermostatic element coacting with said thermostatic element in the operation of the switch, said switch and said electro-responsive element adapted to be included in a circuit from a suitable source of electricity.

7. In an apparatus of the character set forth, the combination of a lever swinging on a fixed pivot, means for swinging said lever, a bar pivoted to said lever, means for swinging the upper end of the bar, a pendulum pivoted to the bar and having projections which are spaced apart at the free end thereof, a switch lever swinging on a fixed pivot, a pin on said switch lever adapted to be engaged at times by said projections, and a spring connecting the free end of the pendulum and the free end of the switch lever, the arrangement being such that when the pivot of the pendulum is moved in one direction the spring will be moved past the dead center and cause the free end of the pendulum to swing in one direction, and when the pivot of the pendulum is moved in the opposite direction past the dead center the free end thereof will be swung to move the switch lever in the opposite direction.

8. A switch mechanism for opening and closing a circuit, means for initially actuating said mechanism toward opening or closing position, and independently operable auxiliary means energized by the current of the circuit to coact with said first named means to complete such opening or closing of the switch mechanism.

9. A control operating mechanism for controlling an electric circuit characterized by having two independently operative actuating devices one of which is adapted to be actuated by the current in said circuit and acts in advance of the other to partly move the mechanism to actuating position, and the other is actuated by other instrumentalities than those which actuate the first named device to complete the actuating movement.

10. In a switch actuating device, the combination of a fixed contact, a pivoted switch lever coacting therewith, a combined tension and striking means for moving the switch lever into and out of engagement with the fixed contact, a supporting member to which the striking member is pivoted, pressure means for actuating one end of said supporting member, and electro-responsive means for actuating the other end of said supporting member, said pressure means and electro-responsive means being adapted to cooperate in moving the supporting member to open and close the switch.

11. The combination with a switch actuating mechanism, of a prime mover for moving the same toward closing position and a secondary mover which is actuated by other means than those actuating said prime mover for completing the closing movement.

12. The combination with an electric switch, of spring operated overthrow means for actuating the same, a prime mover coacting with the actuating means for moving the same toward closing position and an independent secondary mover operated by other forces than the prime mover for finishing the closing movement, said primary and secondary movers also coacting to permit the actuating mechanism to open the switch.

13. A switch mechanism for opening and closing a circuit, means for actuating said switch mechanism through a portion only of its movement, and auxiliary actuating means for bringing said switch mechanism within operating range of said first named actuating means.

14. The combination with mechanism for automatically opening and closing an electric circuit, of means for actuating said mechanism including two instrumentalities which are independent of each other but arranged so that it requires the combined effort of both of said instrumentalities to operate the mechanism, one of said instrumentalities being actuated by forces other than those which actuate the other instrumentality.

15. The combination with an overthrow mechanism carrying one or more contacts, of means for actuating said mechanism, by means of two forces which are independent of each other but which coact in such a way that it requires the combined effort of said forces to actuate the mechanism.

16. The combination with mechanism for automatically opening and closing an electric circuit, of two means for operating the same which are actuated from different sources of power, arranged in such a way that the mechanism is actuated by the combined effort of both of said means.

17. The combination of a main lever member, a pivoted tongue member, an electric contact on one of said members adapted to coact with another contact, a secondary lever pivoted to one of said members, a spring connected with said secondary lever and with the other of said members, said levers being so arranged that a movement of the main lever will cause the secondary lever to be thrown by said spring which in turn will actuate the tongue member, the path of movement of the connection between said spring and secondary lever being located in a zone intermediate the pivotal axis of a certain of said members and the path of movement of the pivotal axis of said secondary lever.

18. The combination of a main lever, means for operating said lever, a secondary lever pivoted to said main lever, a vibrating tongue, an electric contact carried by said tongue, a spring connected with said secondary lever and said tongue, said levers being so arranged that a movement of the main lever will swing the pivot of the secondary lever and cause the secondary lever to be overthrown by said spring which in turn will actuate the vibrating tongue, the path of movement of the connection between said spring and secondary lever being located in a zone intermediate the pivotal axis of said main lever, and the path of movement of the pivotal axis of said secondary lever.

19. The combination of a main lever, means for operating said lever, a secondary lever pivoted to said main lever, a vibrating tongue, an electric contact on said tongue, a spring connected with said secondary lever and said tongue, said levers being so arranged that the movement of the main lever will swing the pivot of the secondary lever and cause the secondary lever to be overthrown by said spring which in turn will actuate the vibrating tongue, said secondary lever having stop members thereon so positioned that when said lever is at the limit of its movement in either direction, one of said members will engage a coacting stop positioned at substantially the center of oscillation.

20. The combination with an overthrow mechanism for rapidly actuating a controlling member, of means for actuating said mechanism, including two actuating elements which are operated by different forces but which coact in such a way that it requires the combined effort of said elements to actuate the mechanism.

21. The combination of a main lever member, a pivoted tongue member, an electric contact on one of said members adapted to coact with another contact, a bifurcated secondary lever having two bearings in one end connecting it with two bearings on one of said members, a spring connected with the other end of said secondary lever and with the other of said members, said levers being so arranged that a movement of the main lever member will cause the secondary lever to be overthrown by said spring, which in turn will actuate the tongue member, the path of movement of the connection between said spring and secondary lever being located in a zone intermediate of the pivotal axis of a certain of said members and the path of movement of the pivotal axis of said secondary lever.

22. The combination of a main lever member, a pivoted tongue member, an electric contact on one of said members adapted to coact with another contact, a U-shaped secondary lever having the upper ends of both legs pivoted to one of said members, a spring connected with the bridge of said U-shaped secondary lever and with the other of said members, said levers being so arranged that a movement of the main lever member will cause the secondary lever to be overthrown by said spring, which in turn will actuate the tongue member, the path of movement of the connection between said spring and secondary lever being located in a zone intermediate to the pivotal axis of a certain of said members and the path of movement of the pivotal axis of said secondary lever.

23. The combination of a main lever member, a pivoted tongue member, an electric contact on one of said members adapted to coact with another contact, a secondary lever pivoted to one of said members, a spring connected with said secondary lever and the other of said members, said members being so arranged that a movement of the main lever member will cause the secondary lever to be overthrown by said spring, which in turn will actuate the tongue member, means for swinging said main lever a certain predetermined percentage of the stroke necessary for overthrowing the mechanism, and other means actuated by the medium to be controlled also acting upon the main lever to swing it, said two means being so arranged that the first named means will not swing the main lever far enough to overthrow the mechanism, but when the second means is acting upon the main lever in the same direction as said first means the stroke of the main lever will be large enough to overthrow the mechanism.

24. In an apparatus for automatically opening and closing an electric circuit, the combination of contact carrying lever, an operating bar, an overthrow mechanism fulcrumed to said bar and contact carrying lever, said mechanism being adapted to be overthrown by a certain length of movement of its fulcrum on the operating bar, means acting upon the operating bar to move said fulcrum a certain distance, and pressure responsive means also acting upon the operating bar for moving said fulcrum, said means being so arranged that the first named means will not move said fulcrum of the overthrow mechanism far enough to overthrow same, but when the effort of said first means and said second means is acting upon the operating bar in such a way that their combined efforts are tending to swing its fulcrum to the overthrow mechanism in the same direction the overthrow mechanism will be overthrown which in turn will actuate the contact carrying lever.

25. The combination of a main lever member, a pivoted tongue member, an electric contact on one of said members adapted to coact with another contact, a secondary lever pivoted to one of said members, a spring connected with said secondary lever and the other of said members, said levers being so arranged that a movement of the main lever member will cause the secondary lever to be overthrown by said spring, which in turn will actuate the tongue member, power actuated means to swing said main lever member, and other means actuated by the medium to be controlled to swing same main lever member, said two means being so arranged that said first means will not swing the fulcrum of the secondary lever far enough to throw the overthrow mechanism, but when said second means is acting upon the main lever member in the same direction as the said first means the movement of said fulcrum will be large enough to overthrow the overthrow mechanism.

26. In an apparatus for automatically opening and closing an electric circuit, the combination of a contact carrying lever, an operating bar, an overthrow mechanism fulcrumed to said bar and contact carrying lever, said mechanism being adapted to be overthrown by a certain length of oscillation of its fulcrum on the operating bar, means acting upon the operating bar for oscillating said fulcrums within certain limits and temperature responsive means also acting upon the operating bar to oscillate said fulcrum, said means being so arranged that the first named means will not oscillate the fulcrum of the overthrow mechanism far enough to overthrow same, but when the effort of both means are acting upon the operating bar in such a way that their combined efforts are tending to swing its fulcrum to the overthrow mechanism in the same direction the overthrow mechanism will be overthrown, which in turn will swing the contact carrying lever.

EMIL T. JOHNSSON.